United States Patent
Littrell et al.

(10) Patent No.: US 12,216,746 B2
(45) Date of Patent: Feb. 4, 2025

(54) BIOMETRIC AUTHENTICATION USING VOICE ACCELEROMETER

(71) Applicant: Qualcomm Technologies Inc., San Diego, CA (US)

(72) Inventors: Robert J. Littrell, Boston, MA (US); Mathew Crowley, Boston, MA (US)

(73) Assignee: QUALCOMM Technologies, Inc., San Diego, CA (US)

( * ) Notice: Subject to any disclaimer, the term of this patent is extended or adjusted under 35 U.S.C. 154(b) by 522 days.

(21) Appl. No.: 17/339,813

(22) Filed: Jun. 4, 2021

(65) Prior Publication Data

US 2021/0382972 A1    Dec. 9, 2021

Related U.S. Application Data

(60) Provisional application No. 63/034,857, filed on Jun. 4, 2020.

(51) Int. Cl.
| | | |
|---|---|---|
| *H04L 29/06* | (2006.01) | |
| *G05B 19/042* | (2006.01) | |
| *G06F 21/32* | (2013.01) | |
| *G10L 17/04* | (2013.01) | |
| *G10L 17/06* | (2013.01) | |
| *G10L 17/22* | (2013.01) | |
| *H04R 17/02* | (2006.01) | |
| *H04R 19/04* | (2006.01) | |

(52) U.S. Cl.
CPC ............ *G06F 21/32* (2013.01); *G05B 19/042* (2013.01); *G10L 17/04* (2013.01); *G10L 17/06* (2013.01); *G10L 17/22* (2013.01); *H04R 17/02* (2013.01); *H04R 19/04* (2013.01); *G05B 2219/24167* (2013.01); *G06F 2221/2133* (2013.01); *H04R 2201/003* (2013.01)

(58) Field of Classification Search
CPC ............ G06F 21/32; G06F 2221/2133; G05B 19/042; G05B 2219/24167; G10L 17/04; G10L 17/06; G10L 17/22; G10L 17/00; H04R 17/02; H04R 19/04; H04R 2201/003; H04R 2420/07; H04R 1/1041
See application file for complete search history.

(56) References Cited

U.S. PATENT DOCUMENTS

| | | | |
|---|---|---|---|
| 8,963,806 B1 * | 2/2015 | Starner | G06F 21/32 345/7 |
| 2007/0205876 A1 * | 9/2007 | Nguyen | B60R 25/00 340/5.52 |
| 2017/0116995 A1 * | 4/2017 | Ady | H04W 12/06 |
| 2018/0068671 A1 * | 3/2018 | Fawaz | G10L 25/78 |
| 2019/0012448 A1 * | 1/2019 | Lesso | H04W 12/06 |
| 2019/0281393 A1 | 9/2019 | Grosh et al. | |
| 2019/0295554 A1 * | 9/2019 | Lesso | G10L 17/04 |
| 2020/0408799 A1 | 12/2020 | Littrell et al. | |
| 2021/0306762 A1 * | 9/2021 | Barrett | H04R 1/46 |

* cited by examiner

*Primary Examiner* — William A Corum, Jr.
(74) *Attorney, Agent, or Firm* — QUALCOMM Technologies, Inc.

(57) ABSTRACT

Techniques for biometric authentication using a voice accelerometer and an acoustic transducer includes receiving a first signal representing an output by a voice accelerometer of a device and a second signal representing an output by an acoustic transducer of the device. Characteristics of each of the first signal and the second signal are compared with stored biometric characteristics for a user of the device. The user of the device is then authenticated based on the comparison.

20 Claims, 9 Drawing Sheets

BIOMETRIC AUTHENTICATION USING VOICE ACCELEROMETER

PRIORITY

This application claims priority to and the benefit of U.S. Provisional Patent Application No. 63/034,857, filed Jun. 4, 2020, the entire contents of which is incorporated herein by reference.

TECHNICAL FIELD

This disclosure relates generally to techniques for authenticating a user of a device based on the user's voice.

BACKGROUND

Biometric authentication is a form of security that measures and matches biometric features of a user to verify that a person trying to access a particular device or function is authorized to do so. Biometric authentication can be done with a user's voice, but the user's voice can easily be recorded, allowing another person to fake the user's voice. In addition, biometric voice authentication does not work well in noisy environments.

SUMMARY

In general, in an aspect, a method performed by at least one processor for biometric authentication includes receiving a signal representing an output by a voice accelerometer of a device, comparing characteristics of the signal with stored biometric characteristics for a user of the device, and authenticating the user of the device based on the comparison.

In general, in an aspect, a device for performing biometric authentication includes at least one processor and at least one computer-readable storage medium storing instructions that are executable by the at least one processor to perform operations including receiving a signal representing an output by a voice accelerometer, comparing characteristics of the signal with stored biometric characteristics for a user, and authenticating the user based on the comparison.

In general, in an aspect, the one or more non-transitory computer-readable storage medium storing instructions that are executable by at least processor to perform operations including receiving a signal representing an output by a voice accelerometer of a device, comparing characteristics of the signal with stored biometric characteristics for a user of the device, and authenticating the user of the device based on the comparison.

In general, in an aspect, a method performed by at least one processor for biometric authentication includes: receiving a first signal representing an output by an acoustic transducer of a device, comparing characteristics of the first signal with stored biometric characteristics for a user of the device, receiving a second signal representing an output by a voice accelerometer of the device, determining that the second signal is indicative of voice activity by a user of the device, and authenticating the user of the device based on the comparison and the determination that the second signal is indicative of voice activity by the user.

Implementations of one or more of the above aspects can include one or more of the following features.

In some examples, the signal representing the output by the voice accelerometer is a first signal, and the operations include receiving a second signal representing an output by an acoustic transducer of the device, comparing characteristics of each of the first signal and the second signal with stored biometric characteristics for a user of the device, and authenticating the user of the device based on the comparison.

In some examples, the stored biometric characteristics include at least one of duration, intensity, dynamics, or pitch of one or more signals previously captured by the voice accelerometer and the acoustic transducer of the device. In some examples, the stored biometric characteristics include an intensity of at least a portion of a signal captured by the voice accelerometer relative to an intensity of at least a portion of a signal captured by the acoustic transducer. In some examples, the stored biometric characteristics include characteristics of signals previously captured by the voice accelerometer at different positions of the device relative to the user.

In some examples, comparing characteristics of each of the first signal and the second signal with the stored biometric characteristics includes comparing characteristics of the first signal with characteristics of a previously captured voice accelerometer signal, comparing characteristics the second signal with characteristics of a previously captured acoustic transducer signal, comparing a relationship between the first signal and the second signal with a relationship between the previously captured voice accelerometer signal and the previously captured acoustic transducer signal.

In some examples, authenticating the user of the device includes determining that at least one of the characteristics of the first signal and the second signal correspond to at least one of the stored biometric characteristics with a threshold level of similarity.

In some examples, a control signal that controls a function of the device or another device is generated in response to authenticating the user of the device.

In some examples, a temperature captured by a temperature sensor of the device is received, and the user of the device is authenticated based on the comparison and a determination that the temperature is within the predetermined range of a human body temperature.

In some examples, a liveness detection algorithm is applied to at least one of the first signal or the second signal, and the user of the device is authenticated based on the comparison and an indication by the liveness detection algorithm that the at least one of the first signal or the second signal correspond to a live signal.

In some examples, the acoustic transducer is a piezoelectric micro-electromechanical system (MEMS) microphone or the voice accelerometer is a piezoelectric MEMS voice accelerometer, or both.

The details of one or more implementations are set forth in the accompanying drawings and the description below. The techniques described here can be implemented by one or more systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

To improve biometric authentication, the technology described here uses a voice accelerometer of a device (e.g., a headset, headphones, or a mobile device, among others) alone or in combination with an acoustic transducer of the device in order to authenticate a user of the device. In particular, the technology compares characteristics of signals received from the voice accelerometer and/or the acoustic transducer with stored biometric characteristics for a user in order to authenticate the user. Once authenticated, the user is allowed access to information and features of the device or another device that require authentication for security purposes. By authenticating a user in this way, the technology provides a more secure and accurate authentication framework relative to, for example, techniques which rely solely on an acoustic signal of the user's voice for authentication.

Figure 1:
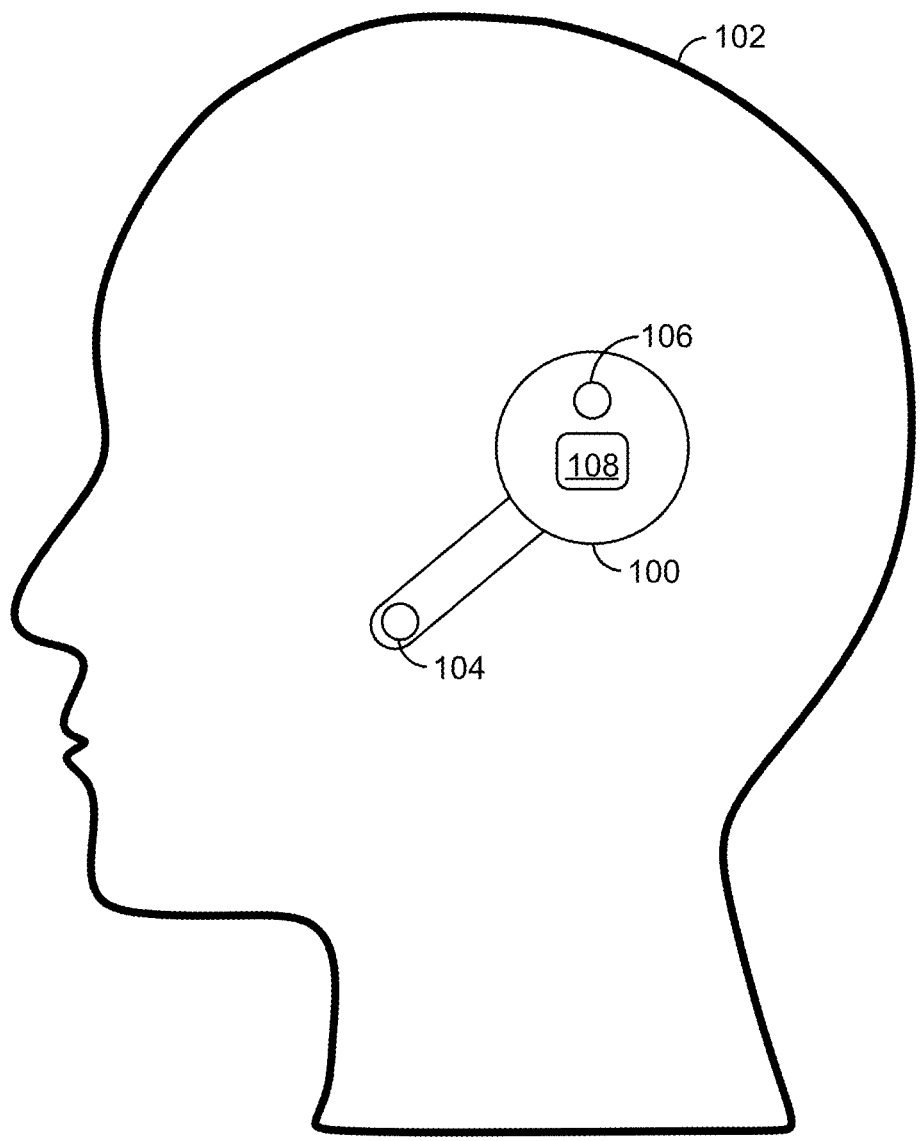
FIG. 1 illustrates an example device for biometric authentication.

FIG. 1 illustrates a device 100 for biometric authentication in accordance with an aspect of the present disclosure. In this example, the device 100 is a headset device worn by a user 102. In other examples, the device 100 can be another device worn by or otherwise in contact with the user 102, such as headphones, earbuds, a wearable device (e.g., a smartwatch, smartglasses, etc.), or a mobile device (e.g., a smartphone) placed in contact with the user's ear, among others.

As shown in FIG. 1, the device 100 includes an acoustic transducer 104, an accelerometer 106, and a controller 108. The acoustic transducer 104 can be a microphone that senses the voice of the user 102 and other acoustic stimuli (e.g., background noise) in a vicinity of the device 100. The user 102 of the device 100 can use the acoustic transducer 104 to convey speech to an application or service (e.g., an authentication application or service) executing on the device 100 or another device that is communicatively coupled to the device 100. In some examples, the acoustic transducer 104 is a piezoelectric MEMS microphone, such as those produced by Vesper Technologies of Boston, MA and described in U.S. patent application Ser. No. 16/353,934, titled "Acoustic Transducer with Gap-Controlling Geometry and Method of Manufacturing an Acoustic Transducer," the entire contents of which is incorporated herein by reference. In other examples, the acoustic transducer 104 is a condenser microphone (sometimes referred to as a capacitive microphone), a dynamic microphone, or another transducer capable of converting sound into an electrical signal.

The accelerometer 106 can be a voice accelerometer (sometimes referred to as a bone conduction sensor) configured to sense vibrations that are transmitted from the vocal chords of the user 102 while the user is speaking, through the bones and/or tissue in, for example, the user's head, and to the device 100. As described herein, the signal produced by the voice accelerometer 106 can be processed (either alone or in combination with the signal produced by the acoustic transducer 104) to authenticate the user 102. In some examples, the voice accelerometer 106 is a piezoelectric micro-electromechanical system (MEMS) voice accelerometer, such as those produced by Vesper Technologies of Boston, MA and described in U.S. patent application Ser. No. 16/900,185, titled "Piezoelectric Accelerometer with Wake Function," the entire contents of which is incorporated herein by reference. In other examples, the voice accelerometer 106 is a capacitive accelerometer, a piezoresistive accelerometer, or another transducer capable of converting vibrations into an electrical signal.

Figure 6:
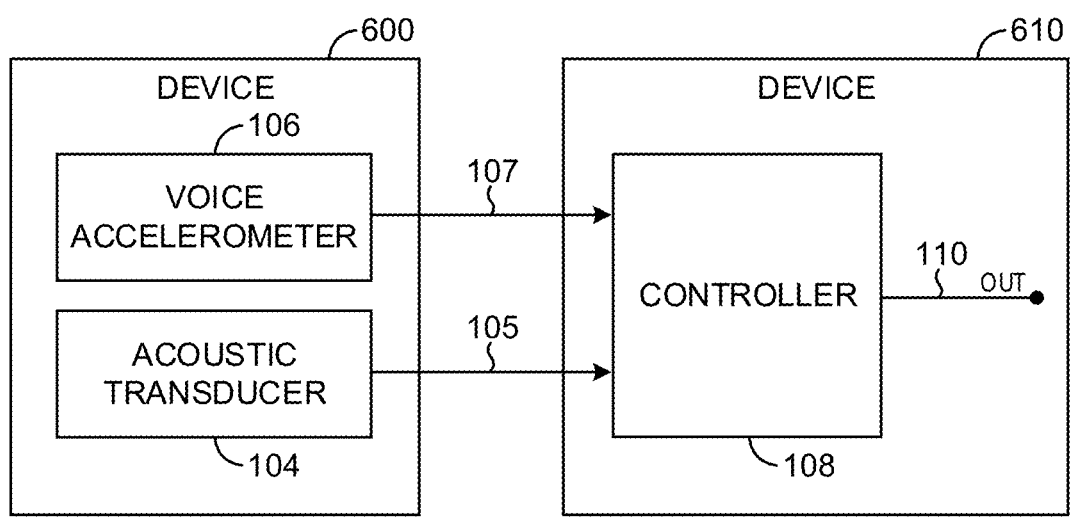
FIGS. 6 and 7 illustrate example devices for biometric authentication.

The controller 108 can include one or more processing components (e.g., a central processing unit (CPU), an application specific integrated circuit (ASIC), a logic circuit, or combinations of them, among others) and one or more storage components (e.g., volatile memory, non-volatile memory, a hard drive, or combinations of them, among others). In some examples, the controller 108 and its underlying components are included in the device 100, as shown in FIG. 1. In other examples, the controller 108 and some or all of its underlying components are included in another device distinct from the device 100, such as shown in FIG. 6.

In general, the controller 108 processes the signals produced by the acoustic transducer 104 and/or the voice accelerometer 106 to perform biometric authentication of the user 102. To do so, the controller 108 can guide the user through an enrollment process in which characteristics of the user's voice (sometimes referred to here as biometric characteristics) are extracted from the signals produced by the acoustic transducer 104 and/or the voice accelerometer 106 and stored in the one or more storage components. After enrollment, the controller 108 can perform biometric authentication by comparing characteristics of live signals from the acoustic transducer 104 and/or the voice accelerometer 106 with the previously stored biometric characteristics. If the controller 108 determines that the characteristics of the live signals correspond to the stored biometric characteristics for the user within a threshold level of similarity, the controller 108 generates a signal that indicates to the device 100 or another coupled device that the user is authenticated. On the other hand, if the controller 108 determines that the characteristics of the live signals do not correspond to the stored biometric characteristics, the controller 108 generates a signal indicating that the user is not authenticated. This biometric authentication provides security and ensures that access to private information (e.g., email or banking information) and features that require a level of security (e.g., purchases of goods) is only given to a specific authorized user.

Figure 2:
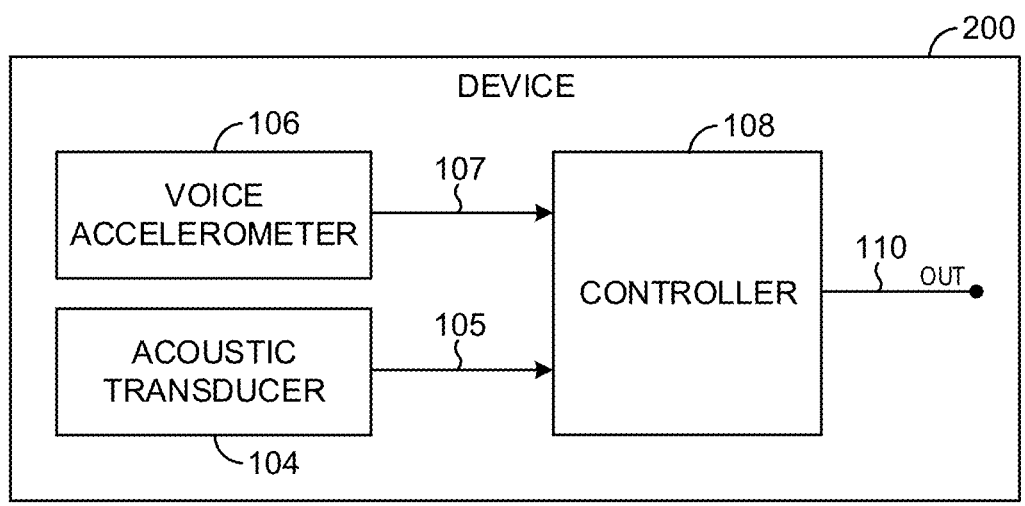
FIG. 2 illustrates an example device for biometric authentication.

Referring to FIG. 2, a device 200 for performing biometric authentication based on a signal from an acoustic transducer 104 and/or a voice accelerometer 106 is shown. The device 200 can be an implementation of the device 100 in accordance with an aspect of the present disclosure. In this example, the acoustic transducer 104 senses the voice of the user 102 and other acoustic stimuli and produces a signal 105 representing the sensed acoustic input. The voice accelerometer 106 senses vibrations emanating from the vocal chords of the user 102 and produces a signal 107 representing the sensed vibrations.

Figure 3:
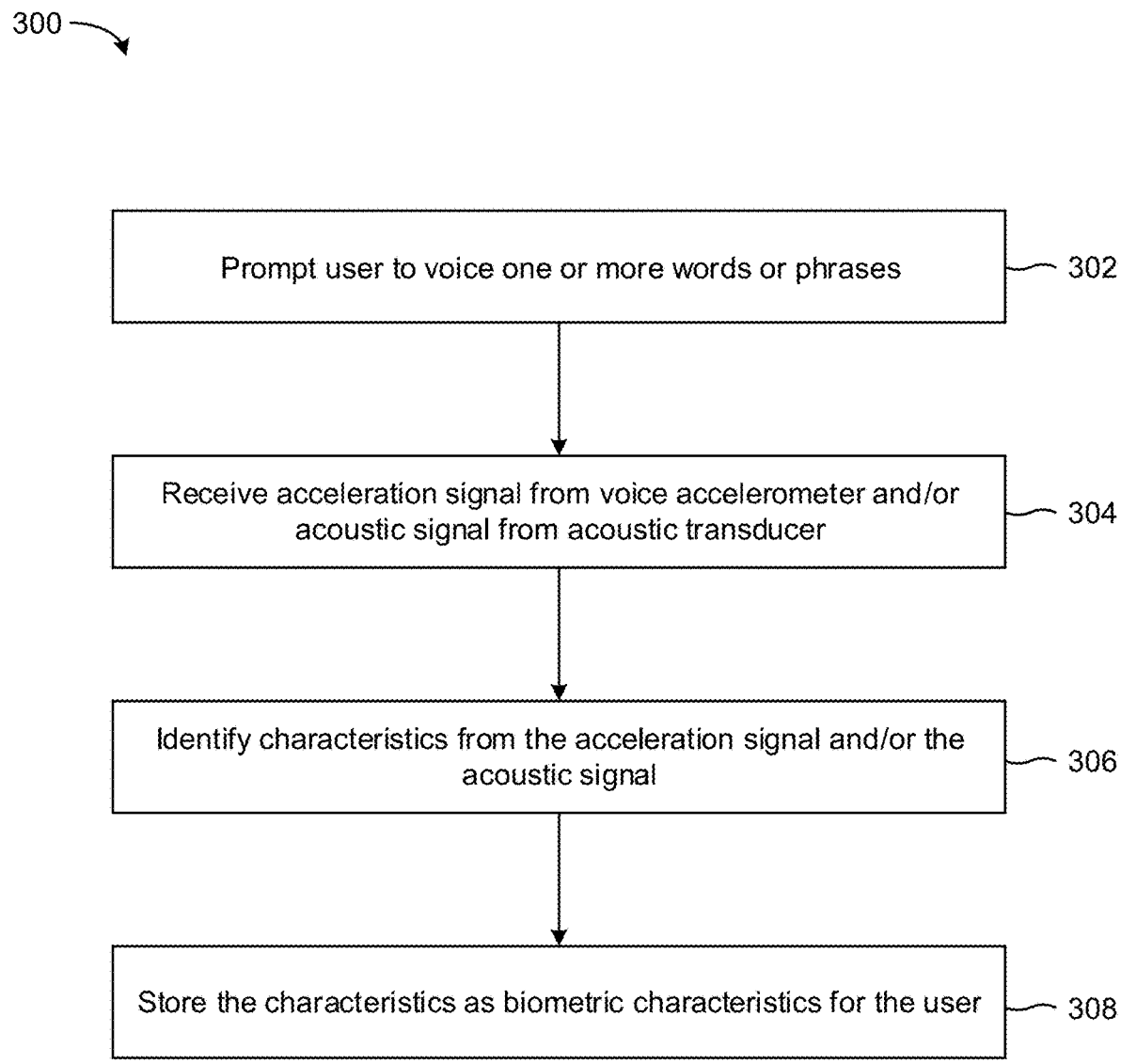
FIG. 3 illustrates an example process for biometric authentication enrollment.

The controller 108 receives and processes the signal 107 to authenticate a user of the device 200. Initially, the controller 108 (or another component of the device 200 or a coupled device) can guide the user of the device 200 through an enrollment process (e.g., based on instructions stored at the controller or provided by an application or service executing on the device 200 or another coupled device). In an example, the controller 108 can carry out some or all of the enrollment process 300 shown in FIG. 3. At 302, the controller 108 prompts the user to voice one or more words or phrases for analysis of the user's voice. In some examples, the prompts can be audio or visual prompts output by a speaker or display of the device 200 or a coupled device. The controller 108 receives 304 the acceleration signal 107 produced by the voice accelerometer 106 and/or the acoustic signal 105 produced by the acoustic transducer 104 for the voiced words or phrases. The controller 108 processes one or both of the received signals 105, 107 to identify 306 biometric characteristics of the user's voice captured through the acoustic transducer 104 and through the voice accelerometer 106. For example, the controller 108 can identify characteristics such as duration (e.g., of the voice words or phrases), intensity, dynamics, pitch, intensity at the voice accelerometer relative to intensity at the acoustic transducer, intensity of lower frequencies relative to intensity of harmonics, or combinations of them, among others. In some examples, the controller 108 also determines a relationship between the signals 105, 107.

After identifying the characteristics, the controller 108 stores 308 the characteristics in a computer-readable storage medium as biometric characteristics for the user. In some examples, the controller 108 can repeat the enrollment process to identify further biometric characteristics or to improve the accuracy of the existing biometric characteristics for the user. For example, since the voice accelerometer 106 may not contact the user's head in the same way every time, the controller 108 can prompt the user to remove and reinstall the device 200 during repetitions of the enrollment process in order to capture characteristics of the user's voice from a range of contact levels that the device 200 may have with the user's head.

Figure 4A:
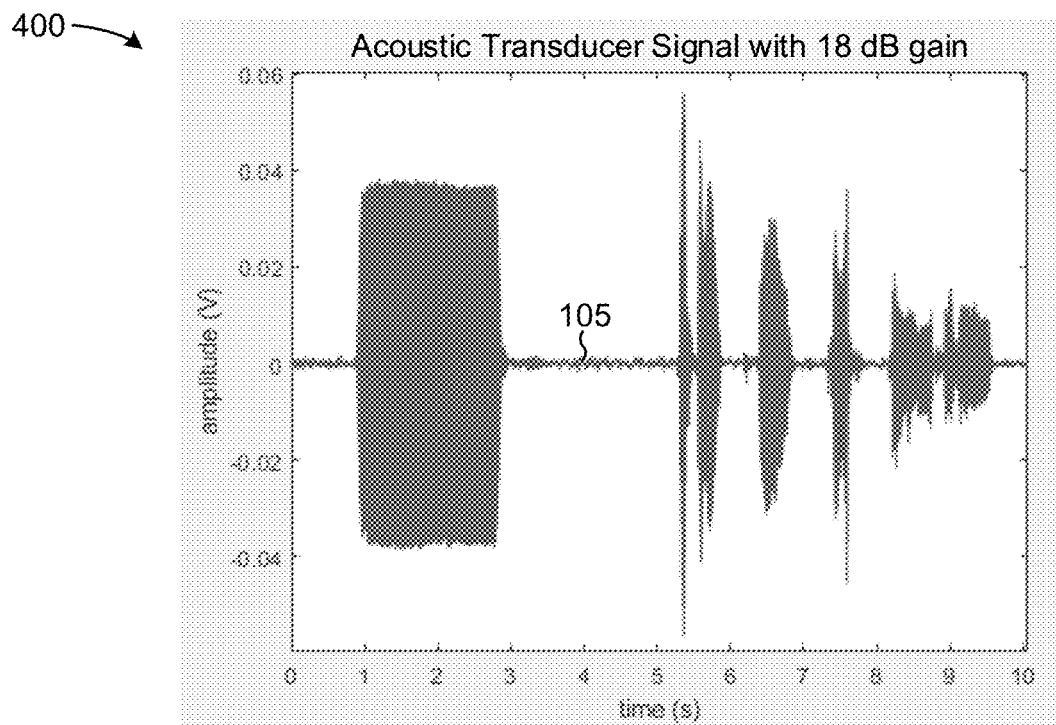
FIG. 4A illustrates an example graph of an acoustic transducer signal.
Figure 4B:
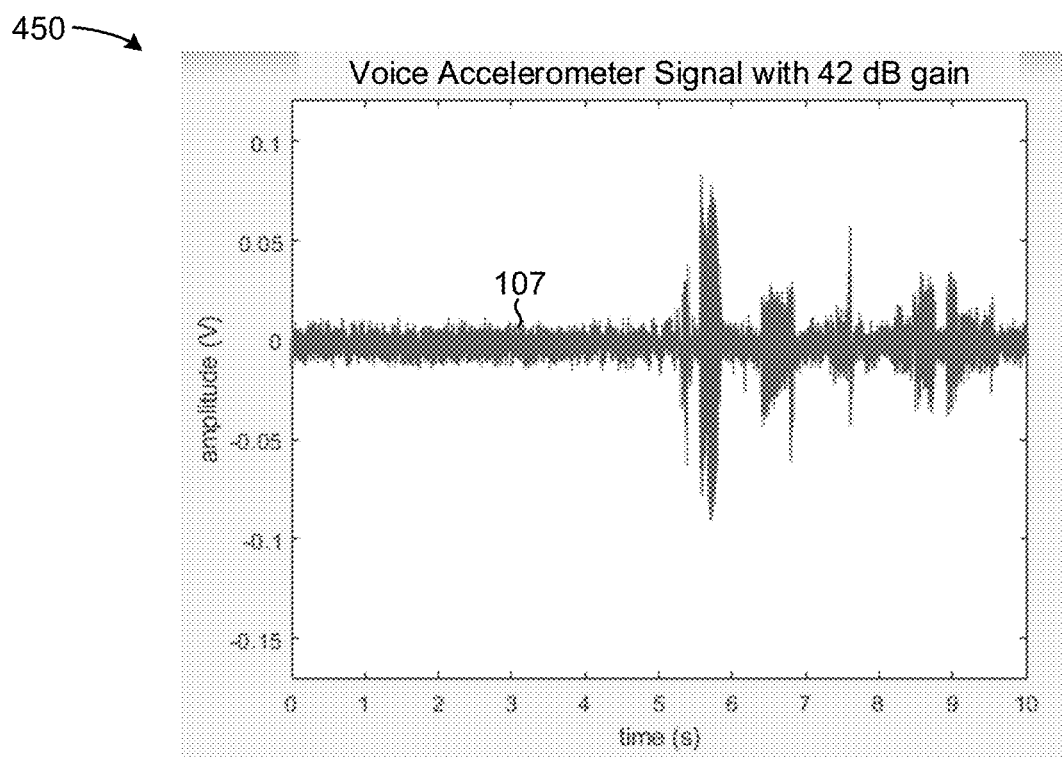
FIG. 4B illustrates an example graph of a voice accelerometer signal.
Figure 7:
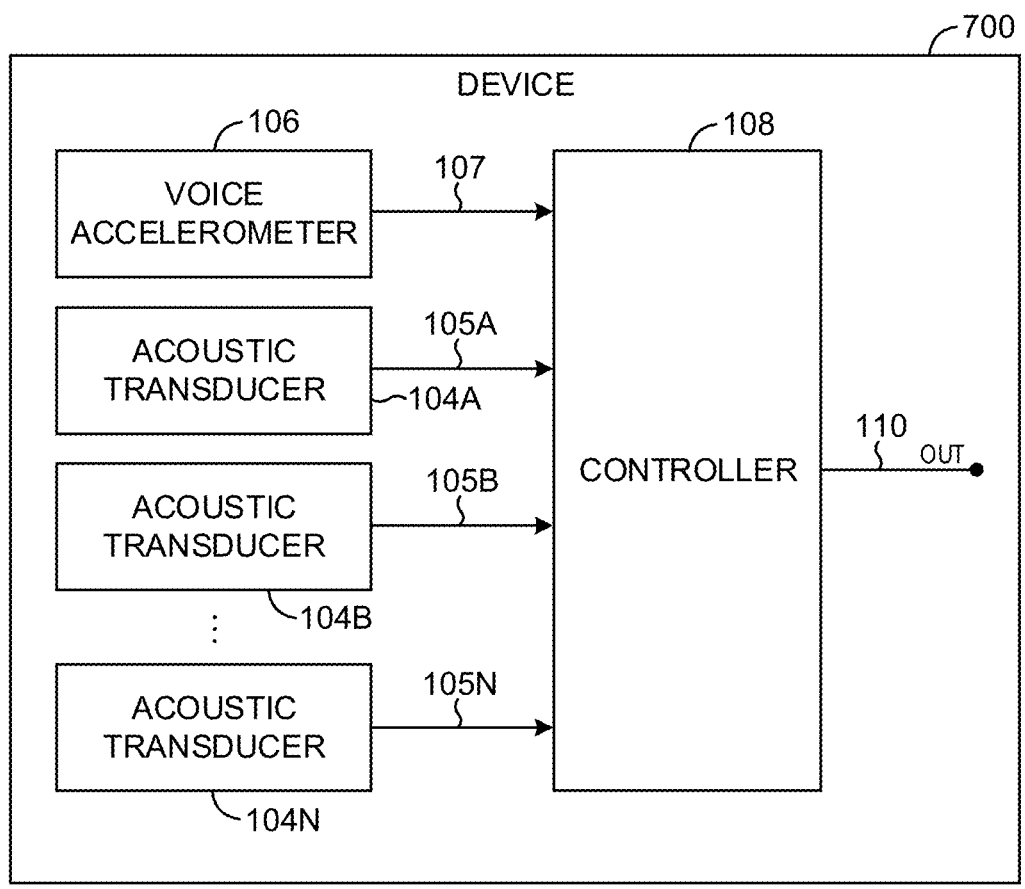

By using a low noise acoustic transducer 104 (e.g., a piezoelectric MEMS acoustic transducer) and/or a low noise voice accelerometer 106 (e.g., a piezoelectric MEMS voice accelerometer), the controller 108 can capture the characteristics more accurately and, therefore, more easily authenticate the user and distinguish them from other users. Also, because the voice accelerometer 106 is not sensitive to background noise or other ambient sounds, its signal 107 can be used to capture characteristics more accurately than, for example, an acoustic transducer. For example, referring to FIG. 4A, a graph 400 of a signal 105 from the acoustic transducer 104 is shown. In this example, a 1 kHz tone with a sound pressure level of 94 dB in a vicinity of the device 200 is sensed by acoustic transducer 104 during seconds 1 to 3. However, this same tone is not detected by the voice accelerometer 106 as shown in the corresponding graph 450 of the signal 107 in FIG. 4B. This comparison demonstrates that the voice accelerometer 106 is immune to air conducted sound, thus allowing for more accurate identification of characteristics in the presence of background noise during both the enrollment and authentication stages. The signal 107 from the voice accelerometer 106 also has a relatively stationary noise floor, which can enable more predictable and accurate identification of characteristics. In some examples, using multiple acoustic transducers in an array (such as shown in FIG. 7) while capturing the voiced words or phrases can also allow the controller 108 to improve accuracy by blocking background noise.

Figure 5:
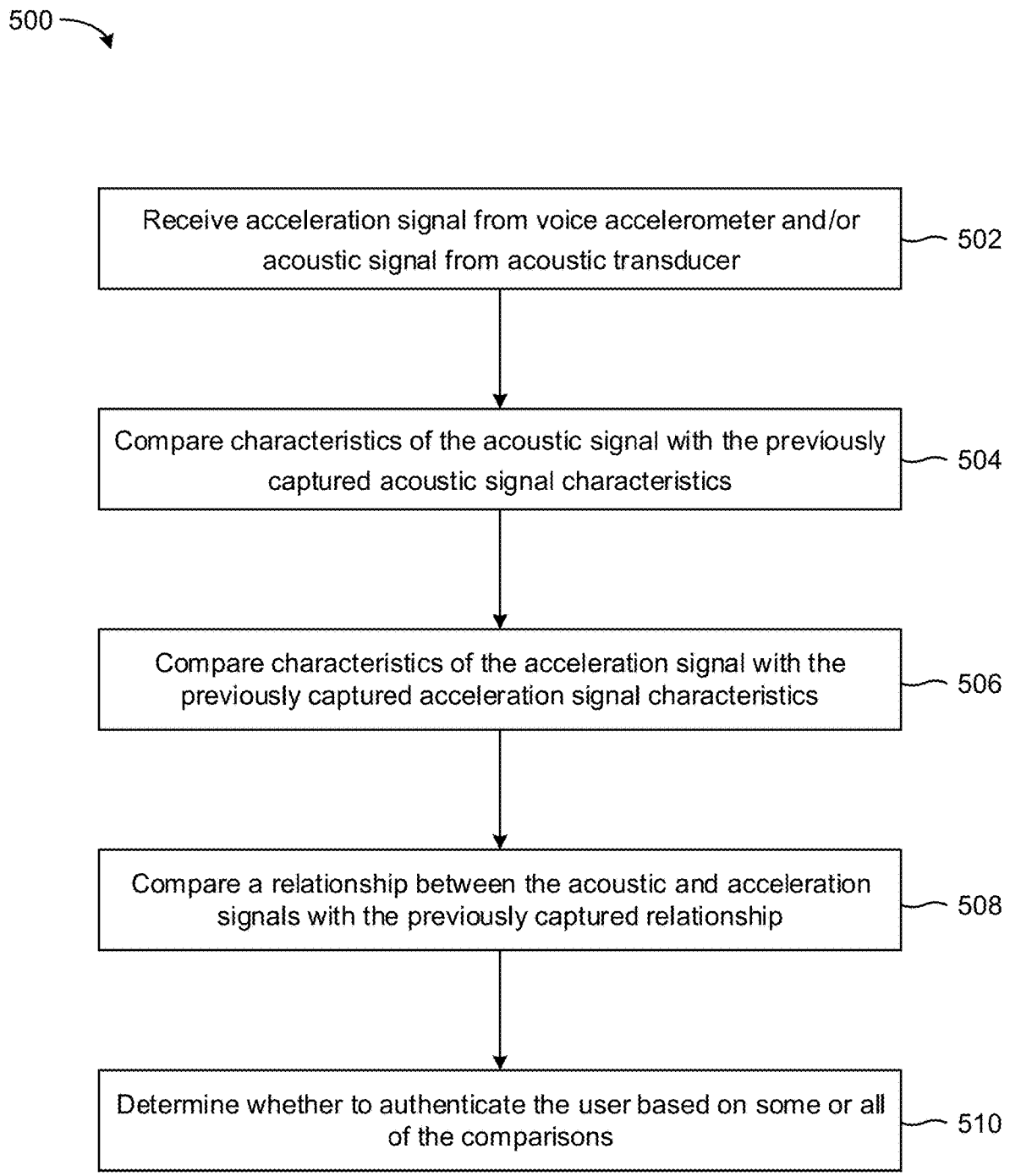
FIG. 5 illustrates an example process for performing biometric authentication.

After enrollment, the controller 108 can perform biometric authentication of a user of the device 200 by comparing characteristics of live signals from the acoustic transducer 104 and/or the voice accelerometer 106 with the stored biometric characteristics. In some examples, the controller 108 can carry out some or all of the process 500 shown in FIG. 5 to perform biometric authentication. At 502, the controller 108 can receive the acceleration signal 107 produced by the voice accelerometer 106 and/or the acoustic signal 105 produced by the acoustic transducer 104. In some examples, the live signals are produced in response to a prompt to the user of the device 200 to voice the same words or phrases used during the enrollment process. The controller 108 compares 502 characteristics of the acoustic signal 105 with the previously captured and stored acoustic signal characteristics for the user to determine whether the live characteristics correspond to the stored characteristics. For example, the controller 108 can determine whether the characteristics of the live signal correspond to the stored biometric characteristics for the user within a threshold level of similarity. In some examples, the controller 108 can apply a Gaussian mixture model or another probabilistic model, a neural network or another machine learning model, or combinations of them, among others to the live and stored characteristics to determine whether they sufficiently correspond to one another. As another example, the controller 108 can compute a cross-correlation (e.g., sliding dot product) of the live and stored characteristics (which can be represented as deterministic signals), calculate an error (e.g., mean-squared error) between the live and stored characteristics, or perform another similarity analysis to determine a similarity between the live and stored characteristics. The controller 108 can use similar techniques to compare 506 characteristics of the acceleration signal 107 with the stored acceleration signal characteristics for the user, and to compare 508 a relationship between the signals 105, 107 and the previously captured relationship. By comparing three sets of characteristics, it becomes much more difficult for one user to imitate or be confused with another user relative to techniques using only one or two of these comparisons.

Based on some or all of the comparisons, the controller 108 determines 510 whether to authenticate the user. In some examples, the controller 108 can authenticate the user if at least one, a majority, a weighted majority, or all of the comparisons indicate that the characteristics of the live signals are sufficiently similar to the stored ones. Referring back to FIG. 2, the controller 108 can generate a control signal 110 indicating whether the user has been authenticated. The signal 110 can be provided to one or more applications or services executing on the device 200 or another device that is coupled to the device through a wired or wireless communication channel. For example, a banking application executing on the device 200 or a coupled device can request authentication of a user by the controller 108 before enabling access to the application. In response, the controller 108 can perform biometric authentication as described herein, and the application can receive the signal 110 and determine whether to allow access.

As an added security measure, the controller 108 can check a temperature sensor of the device 100 to determine that it is approximately at human body temperature. In this manner, the described technology makes it even more difficult to imitate a person. In some examples, a liveness detection algorithm, such as an algorithm that extracts features from one or both of the signals 105, 107 and uses mixture models, neural network models, or other techniques to identify artifacts in the signals, can be used with the technology to detect a recording of the user's voice.

In some examples, the controller 108 can primarily use the acoustic signal 105 produced by the acoustic transducer 104 for biometric authentication, and can use the acceleration signal 107 produced by the voice accelerometer 106 to check for voice activity (e.g., to confirm that the signal 105 is a live signal and not a recording). For example, the controller 108 can compare characteristics of the acoustic signal 105 with stored biometric characteristics for the user as described herein to determine whether the characteristics of the signal 105 sufficiently correspond to the stored characteristics. The controller 108 (or a separate voice detection circuit) can also process the acceleration signal 107 to detect voice activity by the user. For example, the controller 108 can compare one or more features of the signal 107, such as an amplitude of the signal, an energy of the signal, or both, among others, with one or more thresholds. If some or all of the features of the signal 107 satisfy (e.g., exceed) a corresponding threshold, the controller 108 can determine that the user of the device 200 is speaking. On the other hand, if some or all of the features do not satisfy (e.g., are less than) a corresponding threshold, the controller 108 can determine that the user is not speaking. In some examples, the controller 108 can compare one or more features of the signal 107 within a particular frequency band, such as a frequency band from about 100 Hz to about 700 Hz or another frequency band within the range of human voice, with one or more thresholds to detect voice activity by the user of the device 200. In some examples, the controller 108 can apply a voice activity detection algorithm to the signal 107 to detect voice activity by the user of the device 200. Such an algorithm can first extract features from the signal 107, such as number of zero crossings, relative amplitude levels in different frequency bands, changes in levels over time, energy, power, signal-to-noise ratio, pitch, or combinations of them, among others. The algorithm can then apply a detection scheme (e.g., thresholds, a Gaussian mixture model or another probabilistic model, a neural network or another machine learning model, or combinations of them, among others) to detect the presence or absence of voice activity.

If the characteristics of the signal 105 are sufficiently similar to the stored characteristics, and the analysis of the signal 107 indicates a presence of voice activity by the user, then the controller 108 can authenticate the user. On the other hand, if the characteristics of the signal 105 are sufficiently similar to the stored characteristics, but the analysis of the signal 107 indicates an absence of voice activity by the user, then the controller 108 can determine that the sensed acoustic signal is from a recording and can indicate that the user is not authenticated.

FIGS. 6 and 7 illustrate additional implementations of the devices described herein for biometric authentication of a user. Although each of FIGS. 6 and 7 (as well as the other figures) highlight certain features of a particular implementation, it should be noted that the features can be combined with other features described herein in some implementations. Referring to FIG. 6, a device 600 is shown which includes the acoustic transducer 104 and the voice accelerometer 106. In this example, the signals 105, 107 are provided (e.g., over a wired or wireless communication channel) from the device 600 to a distinct device 610, which can be a mobile device, a laptop, a cloud server, or another processing device. The controller 108 of the device 610 processes the signals 105, 107 in accordance with the techniques described herein to perform biometric authentication of a user.

FIG. 7 illustrates a device 700 having multiple acoustic transducers 104A, 104B, . . . , 104N. In this example, the controller 108 can receive the signal 107 from the accelerometer and signals 105A, 105B, . . . , 105N from respective acoustic transducers 104A, 104B, . . . , 104N. The controller 108 can use some or all of the received signals to perform biometric authentication of a user. In some examples, the controller 108 can leverage the multiple acoustic transducers 104A, 104B, . . . , 104N to perform beamforming techniques and increase the accuracy of biometric authentication (e.g., by directing the detection of acoustic signals to the mouth of the user to maximize the detected voice signal, by directing the detection of acoustic signals to areas of background noise for cancellation, etc.).

Figure 8:
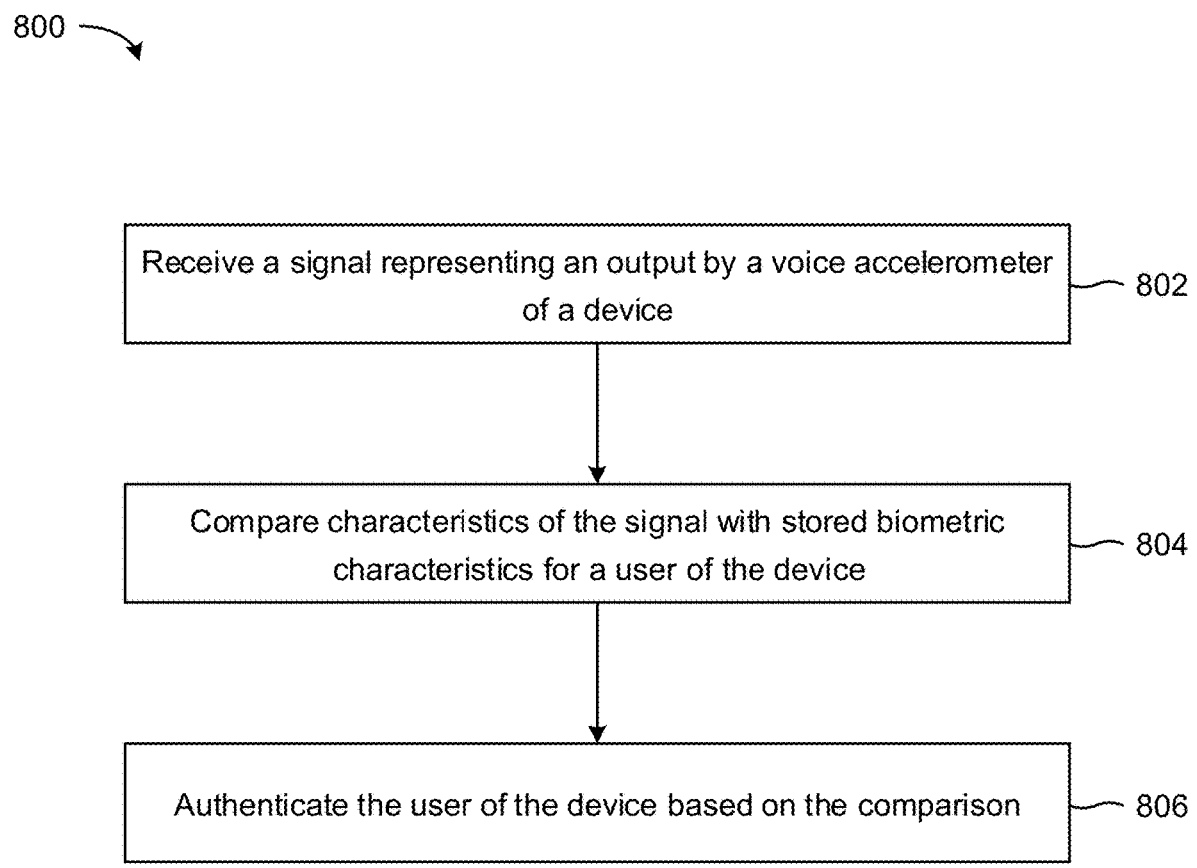
FIG. 8 illustrates an example processes for biometric authentication.

FIG. 8 illustrates an example process 800 for biometric authentication of a user. In some examples, the electronic device(s), system(s), or component(s), or portions or implementations thereof, of FIGS. 1, 2, 6, and 7 are configured to perform the process 800, such as the controller 108, among others.

Operations of the process 800 include receiving 802 a signal representing an output by a voice accelerometer of a device. The device can be, for example, a headset, headphones, earbuds, a wearable device, a mobile device, or another device including one or more of the features described herein. In some examples, the voice accelerometer is a piezoelectric MEMS accelerometer that generates the signal by detecting vibrations of the vocal chords of the user through the device. In some examples, the signal is received by a processor (e.g., the controller 108 or another processing circuit) of the device or another coupled device.

In some examples, the process 800 also includes receiving a signal representing an output by an acoustic transducer of the device. The acoustic transducer can be a piezoelectric MEMS microphone of the device or another device.

At 804, characteristics of the voice accelerometer signal and/or the acoustic transducer signal are compared with stored biometric characteristics for a user of the device. In some examples, the stored biometric characteristics include at least one of duration, intensity, dynamics, or pitch of one or more signals previously captured by the voice accelerometer and/or an acoustic transducer of the device. In some examples, the stored biometric characteristics include characteristics of signals previously captured by the voice accelerometer and/or the acoustic transducer at different positions of the device relative to the user. In some examples, the stored biometric characteristics include an intensity of at least a portion of a signal captured by the voice accelerometer relative to an intensity of at least a portion of a signal captured by the acoustic transducer.

In some examples, comparing characteristics of the acceleration signal and/or the acoustic signal with the stored biometric characteristics includes comparing characteristics of the accelerometer signal with characteristics of a previously captured voice accelerometer signal, comparing characteristics the acoustic signal with characteristics of a previously captured acoustic transducer signal, or comparing a relationship between the accelerometer signal and the acoustic signal with a relationship between the previously captured voice accelerometer signal and the previously captured acoustic transducer signal, or combinations of them.

The user of the device is authenticated 806 based on the comparison. In some examples, authenticating the user of the device includes determining (e.g., by the controller 108) that at least one of the characteristics of the acceleration signal and/or the acoustic signal correspond to at least one of the stored biometric characteristics with a threshold level of similarity (or determining that the user is not authenticated in response to characteristics of one or both of the signals not satisfying the threshold level of similarity to the stored biometric characteristics). In some examples, a control signal that controls a function of the device or another device (such as a function of an application or service executing on the device or the other device) is generated in response to authenticating the user. Such a signal can indicate whether or not the user is authenticated.

In some examples, the process 800 includes receiving a temperature captured by a temperature sensor of the device, and authenticating the user of the device based on the comparison and a determination that the temperature is within the predetermined range of a human body temperature. In some examples, a liveness detection algorithm is applied to at least one of the acceleration signal or the acoustic signal, and the user of the device is authenticated based on the comparison and an indication by the liveness detection algorithm that the at least one of the acceleration signal or the acoustic signal correspond to a live signal.

In some examples, the process 800 (or another process) includes receiving an acoustic signal representing an output by an acoustic transducer of a device, comparing characteristics of the acoustic signal with stored biometric characteristics for a user of the device, receiving an acceleration signal representing an output by a voice accelerometer of the device, determining that the acceleration signal is indicative of voice activity by a user of the device, and authenticating the user of the device based on the comparison and the determination that the acceleration signal is indicative of voice activity by the user.

Figure 9:
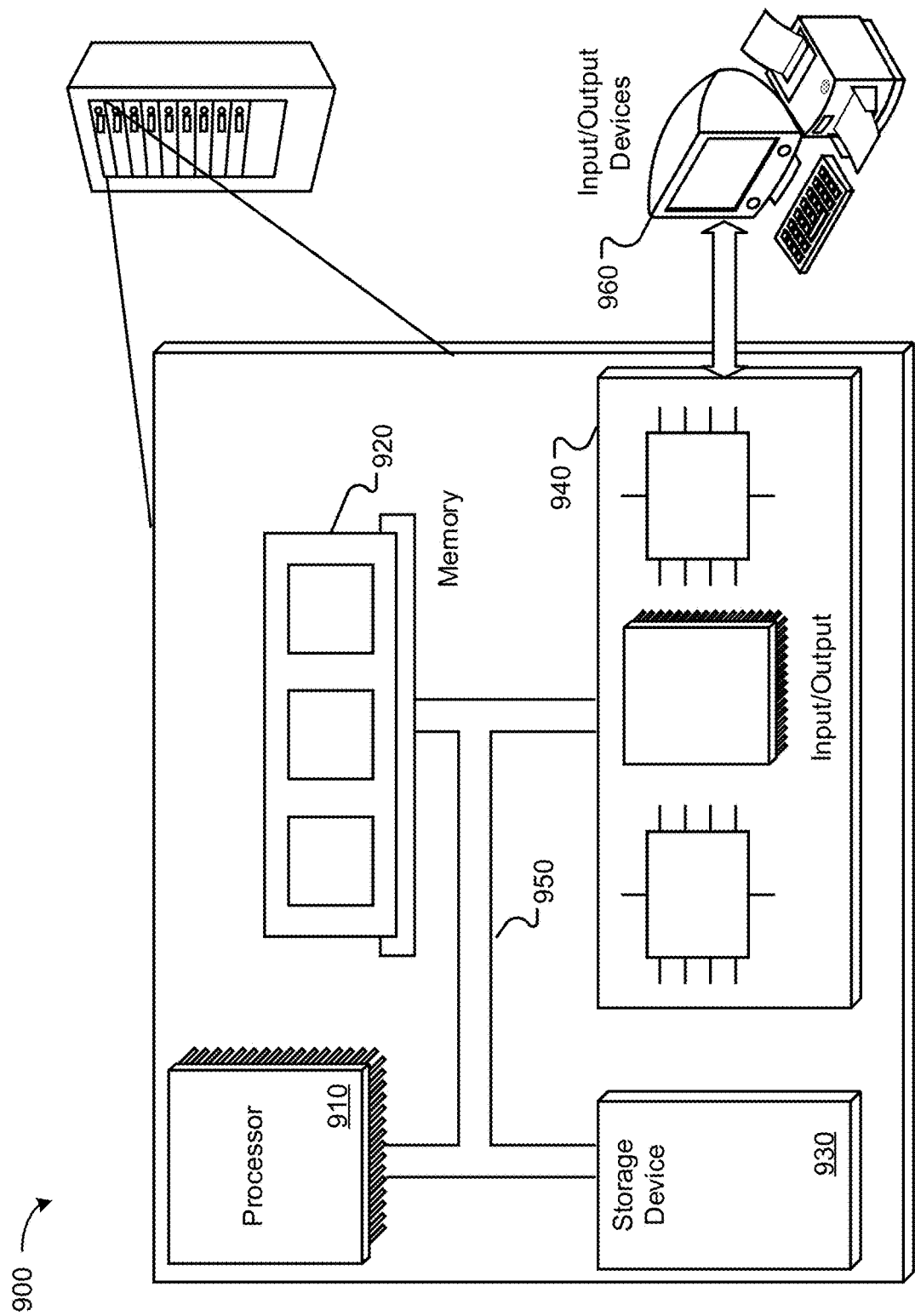
FIG. 9 illustrates an example computer system.

FIG. 9 is a block diagram of an example computer system 900. For example, referring to FIG. 1, the device 100 or a component thereof, such as the controller 108, could be an example of the system 900 described here. The system 900 includes a processor 910, a memory 920, a storage device 930, and one or more input/output interface devices 940. Each of the components 910, 920, 930, and 940 can be interconnected, for example, using a system bus 950.

The processor 910 is capable of processing instructions for execution within the system 900. The term "execution" as used here refers to a technique in which program code causes a processor to carry out one or more processor instructions. In some implementations, the processor 910 is a single-threaded processor. In some implementations, the processor 910 is a multi-threaded processor. The processor 910 is capable of processing instructions stored in the memory 920 or on the storage device 930. The processor 910 may execute operations such as those described with reference to FIGS. 3, 5, and 8.

The memory 920 stores information within the system 900. In some implementations, the memory 920 is a computer-readable medium. In some implementations, the memory 920 is a volatile memory unit. In some implementations, the memory 920 is a non-volatile memory unit.

The storage device 930 is capable of providing mass storage for the system 900. In some implementations, the storage device 930 is a non-transitory computer-readable medium. In various different implementations, the storage device 930 can include, for example, a hard disk device, an optical disk device, a solid-state drive, a flash drive, magnetic tape, or some other large capacity storage device. In some implementations, the storage device 930 may be a cloud storage device, e.g., a logical storage device including one or more physical storage devices distributed on a network and accessed using a network. In some examples, the storage device may store long-term data. The input/output interface devices 940 provide input/output operations for the system 900. In some implementations, the input/output interface devices 940 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 900 to communicate, for example, transmit and receive data. In some implementations, the input/output device can include driver devices configured to receive input data and send output data to other input/output devices, e.g., keyboard, printer and display devices 960. In some implementations, mobile computing devices, mobile communication devices, and other devices can be used.

In some examples, the system 900 is contained within a single integrated circuit package. A system 900 of this kind, in which both a processor 910 and one or more other components are contained within a single integrated circuit package and/or fabricated as a single integrated circuit, is sometimes called a controller or microcontroller. In some implementations, the integrated circuit package includes pins that correspond to input/output ports, e.g., that can be used to communicate signals to and from one or more of the input/output interface devices 940.

Although an example processing system has been described in FIG. 9, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "controller," "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a GNSS sensor or receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A method performed by at least one processor for biometric authentication, comprising:
   receiving, by the at least one processor, a first signal representing an output by a voice accelerometer of a device;
   determining, by the at least one processor, that at least one feature of the first signal is greater than at least one feature threshold, wherein the at least one feature includes at least one of an amplitude of the first signal or an energy of the first signal;
   determining, by the at least one processor, that the first signal is a live voice signal of a user of the device based on determining that the at least one feature of the first signal is greater than the at least one feature threshold;
   receiving, by the at least one processor, a second signal representing an output by an acoustic transducer of the device;
   performing, by the at least one processor, a first comparison of biometric characteristics of the first signal with stored voice accelerometer signal biometric characteristics for the user of the device;
   performing, by the at least one processor, a second comparison of biometric characteristics of the second signal with stored acoustic signal biometric characteristics for the user of the device; and
   authenticating, by the at least one processor, the user of the device based on determining that the first signal is the live voice signal of the user, based on the first comparison indicating the biometric characteristics of the first signal are within a threshold level of similarity to the stored voice accelerometer signal biometric characteristics for the user, and based on the second comparison indicating the biometric characteristics of the second signal are within the threshold level of similarity to the stored acoustic signal biometric characteristics for the user.

2. The method of claim 1, wherein the stored voice accelerometer signal biometric characteristics comprise at least one of duration, intensity, dynamics, or pitch of one or more signals previously captured by the voice accelerometer, and wherein the stored acoustic signal biometric characteristics comprise at least one of duration, intensity, dynamics, or pitch of one or more signals previously captured by the acoustic transducer of the device.

3. The method of claim 1, wherein the at least one of the stored voice accelerometer signal biometric characteristics or the stored acoustic signal biometric characteristics comprise an intensity of at least a portion of a signal captured by the voice accelerometer relative to an intensity of at least a portion of a signal captured by the acoustic transducer.

4. The method of claim 1, wherein the stored voice accelerometer signal biometric characteristics comprise biometric characteristics of signals previously captured by the voice accelerometer at different positions of the device relative to the user.

5. The method of claim 1, further comprising:
   comparing the biometric characteristics of the first signal with biometric characteristics of a previously captured voice accelerometer signal;
   comparing the biometric characteristics the second signal with biometric characteristics of a previously captured acoustic transducer signal;
   comparing a relationship between the first signal and the second signal with a relationship between the previously captured voice accelerometer signal and the previously captured acoustic transducer signal; and
   authenticating the user of the device further based on comparing the relationship.

6. The method of claim 1, comprising:
   in response to authenticating the user of the device, generating a control signal that controls a function of the device or another device.

7. The method of claim 1, comprising:
   receiving a temperature captured by a temperature sensor of the device; and
   authenticating the user of the device further based on a determination that the temperature is within a predetermined range of a human body temperature.

8. The method of claim 1, wherein the device includes the at least one processor.

9. The method of claim 1, wherein the at least one processor is included in another device that is distinct from the device.

10. The method of claim 1, wherein the acoustic transducer is at least one of a piezoelectric micro-electromechanical system (MEMS) microphone or the voice accelerometer is a piezoelectric MEMS voice accelerometer.

11. A device for performing biometric authentication, comprising:
    at least one processor; and
    at least one computer-readable storage medium storing instructions that are executable by the at least one processor to:
      receive a first signal representing an output by a voice accelerometer;
      determine that at least one feature of the first signal is greater than at least one feature threshold, wherein the at least one feature includes at least one of an amplitude of the first signal or an energy of the first signal;
      determine that the first signal is a live voice signal of a user of the device based on a determination that the at least one feature of the first signal is greater than the at least one feature threshold;
      receive a second signal representing an output by an acoustic transducer;
      perform a first comparison of biometric characteristics of the first signal with stored voice accelerometer signal biometric characteristics for the user of the device;
      perform a second comparison of biometric characteristics of the second signal with stored acoustic signal biometric characteristics for the user of the device; and
      authenticate the user based on a determination that the first signal is the live voice signal of the user, based on the first comparison indicating the biometric characteristics of the first signal are within a threshold level of similarity to the stored voice accelerometer signal biometric characteristics for the user, and based on the second comparison indicating the biometric characteristics of the second signal are within the threshold level of similarity to the stored acoustic signal biometric characteristics for the user.

12. The device of claim 11, wherein the at least one computer-readable storage medium stores instructions that are executable by the at least one processor to:
    compare the biometric characteristics of the first signal with biometric characteristics of a previously captured voice accelerometer signal;
    compare the biometric characteristics the second signal with biometric characteristics of a previously captured acoustic transducer signal;

compare a relationship between the first signal and the second signal with a relationship between the previously captured voice accelerometer signal and the previously captured acoustic transducer signal; and authenticate the user of the device further based on comparing the relationship.

13. The device of claim 11, wherein, to authenticate the user of the device, the at least one computer-readable storage medium stores instructions that are executable by the at least one processor to generate a control signal that controls a function of the device or another device.

14. One or more non-transitory computer-readable storage mediums storing instructions that are executable by at least one processor to:

receive a first signal representing an output by a voice accelerometer of a device;

determine that at least one feature of the first signal is greater than at least one feature threshold, wherein the at least one feature includes at least one of an amplitude of the first signal or an energy of the first signal;

determine that the first signal is a live voice signal of a user of the device based on a determination that the at least one feature of the first signal is greater than the at least one feature threshold;

receive a second signal representing an output by an acoustic transducer of the device;

perform a first comparison of biometric characteristics of the first signal with stored voice accelerometer signal biometric characteristics for the user of the device;

perform a second comparison of biometric characteristics of the second signal with stored acoustic signal biometric characteristics for the user of the device; and authenticate the user based on a determination that the first signal is the live voice signal of the user, based on the first comparison indicating the biometric characteristics of the first signal are within a threshold level of similarity to the stored voice accelerometer signal biometric characteristics for the user, and based on the second comparison indicating the biometric characteristics of the second signal are within the threshold level of similarity to the stored acoustic signal biometric characteristics for the user.

15. The one or more non-transitory computer-readable storage mediums of claim 14, wherein the one or more non-transitory computer-readable storage mediums stores instructions that are executable by the at least one processor to perform operations comprising:

comparing the biometric characteristics of the first signal with biometric characteristics of a previously captured voice accelerometer signal;

comparing the biometric characteristics the second signal with biometric characteristics of a previously captured acoustic transducer signal;

comparing a relationship between the first signal and the second signal with a relationship between the previously captured voice accelerometer signal and the previously captured acoustic transducer signal; and authenticating the user of the device further based on comparing the relationship.

16. The method of claim 1, wherein the at least one feature of the first signal further comprises at least one of a number of zero crossings or a pitch of the first signal.

17. The device of claim 11, wherein the stored voice accelerometer signal biometric characteristics comprise at least one of duration, intensity, dynamics, or pitch of one or more signals previously captured by the voice accelerometer, and wherein the stored acoustic signal biometric characteristics comprise at least one of duration, intensity, dynamics, or pitch of one or more signals previously captured by the acoustic transducer of the device.

18. The device of claim 11, wherein the at least one of the stored voice accelerometer signal biometric characteristics or the stored acoustic signal biometric characteristics comprise an intensity of at least a portion of a signal captured by the voice accelerometer relative to an intensity of at least a portion of a signal captured by the acoustic transducer.

19. The device of claim 11, wherein the stored voice accelerometer signal biometric characteristics comprise biometric characteristics of signals previously captured by the voice accelerometer at different positions of the device relative to the user.

20. The device of claim 11, wherein the at least one computer-readable storage medium stores instructions that are executable by the at least one processor to:

receiving a temperature captured by a temperature sensor of the device; and authenticating the user of the device further based on a determination that the temperature is within a predetermined range of a human body temperature.

* * * * *